United States Patent [19]

Le Viet

[11] Patent Number: 5,372,828
[45] Date of Patent: Dec. 13, 1994

[54] PREPARATION OF CUSTARD WITH MICROWAVE ENERGY

[75] Inventor: Toai Le Viet, Vevey, Switzerland

[73] Assignee: Nestec S.A., Vevey, Switzerland

[21] Appl. No.: 71,760

[22] Filed: Jun. 9, 1993

[30] Foreign Application Priority Data

Jun. 29, 1992 [EP] European Pat. Off. ......... 92110950.0

[51] Int. Cl.⁵ ..................... A23L 1/00; H05B 6/00
[52] U.S. Cl. ......................... 426/241; 99/451; 426/234
[58] Field of Search ............... 426/241, 243, 107, 234; 219/700; 99/451

[56] References Cited

U.S. PATENT DOCUMENTS

| | | | |
|---|---|---|---|
| 3,469,996 | 9/1969 | Endres et al. | 426/241 |
| 3,519,517 | 7/1970 | Dench | 219/700 |
| 4,168,418 | 9/1979 | Bird | 426/417 |
| 4,280,033 | 7/1981 | Wagener et al. | 219/700 |
| 4,343,979 | 8/1982 | Barbini et al. | 219/700 |
| 5,207,151 | 5/1993 | Le Viet et al. | 99/451 |

FOREIGN PATENT DOCUMENTS

| | | |
|---|---|---|
| 4710089 | 7/1990 | Australia . |
| 10350564 | 1/1990 | European Pat. Off. . |
| 10354277 | 2/1990 | European Pat. Off. . |
| 2443205 | 7/1980 | France . |

Primary Examiner—George Yeung
Attorney, Agent, or Firm—Vogt & O'Donnell

[57] ABSTRACT

A custard product is prepared by passing a container containing a liquid custard mix through a microwave field and exposing the liquid mix to microwave field energy, but so that microwave field energy at a position below a position of a base of the mix in the container is reflected away from the mix base, for a time to heat the custard mix to initiate setting the mix and so that upon leaving the field, a contained custard product has a temperature of from 90° C. to 95° C. The custard product then may be exposed to infrared energy to firm and brown the product.

11 Claims, 1 Drawing Sheet

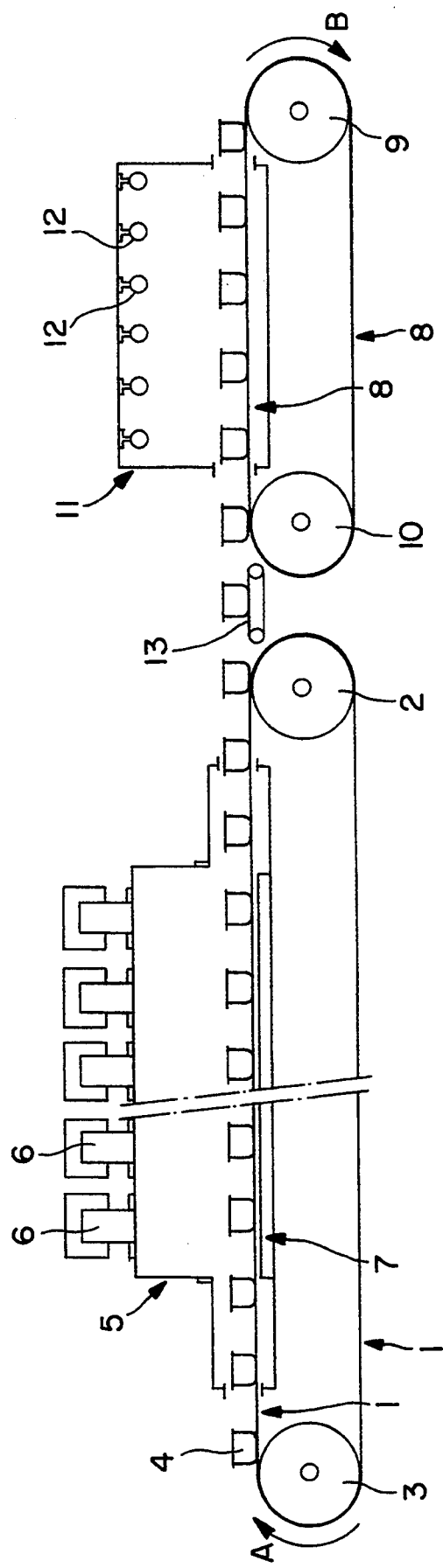

PREPARATION OF CUSTARD WITH MICROWAVE ENERGY

BACKGROUND OF THE INVENTION

This invention relates to a process and an arrangement for the production of caramel custard.

It is known that caramel custard desserts can be produced using conventional heating systems, for example electric plates. In this case, the custard desserts pass through a tunnel equipped with such a heating system, two rows of custard desserts being arranged side by side. The disadvantage of this arrangement is that it necessitates a long cooking time and a tunnel of considerable length. On the other hand, the reflection of energy by the side walls of the tunnel results in an excessive increase in the temperature of the custard desserts situated close to those walls so that the caramel starts to boil and diffuses into the custard. This is totally unacceptable and results in a large number of rejects.

The problem addressed by the present invention was to provide producers of caramel custard with a process and an arrangement in which the setting time would be reduced (for a conventional system, it is of the order of 16 to 18 minutes for an initial custard temperature of the order of 60° C.) and mixing between the caramel and the custard would be avoided during cooking of the custard.

SUMMARY OF THE INVENTION

The present invention provides to a process wherein a liquid custard mix contained in a container is exposed to a microwave field in such a way that it leaves the microwave field at a temperature of 90° to 95° C. and the base of the custard liquid mix in the container is protected during its passage through the microwave field by a material which reflects microwaves. The material which protects the base of the custard mix is arranged beneath the custard. For preparation of a caramel custard, a layer of caramel is at the bottom of the container, the layer of mix for the custard being on top.

DETAILED DESCRIPTION OF THE INVENTION

In practice of the present invention, a protective effect is required so that the microwave field energy which arrives from above penetrates and is absorbed by the custard base is minimal on reaching the caramel layer. The microwave energy arriving from below is reflected by the material forming a barrier. The microwave energy arriving beside the custard is also reflected by the barrier layer and the addition of the incident wave and the reflected wave gives a minimum at the bottom of the container where the caramel layer is situated. The process according to the invention gives a caramel having a temperature of the order of 75° C., i.e., well below the boiling temperature, on leaving the microwave field. In addition, the process according to the invention provides for very even setting and for high uniformity of the final temperature.

The custard may be set in accordance with the invention from liquid custard mix having a temperature, prior to entering the microwave field, of from 10° C. to 60° C., i.e. after preheating, for example by a heat exchanger. Before exposure to the microwave treatment, the containers are filled with caramel and liquid mix by means of known dispensing systems.

For a liquid custard mix entering at 12° C., the heating time is of the order of 6 minutes. For a liquid custard mix entering at 60° C., the heating time is of the order of 3 minutes.

The material forming the microwave barrier may be any electrically conductive metal, particularly iron, copper or aluminium. Aluminium is preferred for reasons of cost and lightness. However, any other metal may, of course, be used.

Taking industrial requirements into account, throughputs of 2,000 to 12,000 containers per hour have to be reached, for example by arranging six rows of containers to pass through the microwave field.

The custard desserts pass through the microwave field at a rate of 1 to 3 m/minute.

Passage through the microwave field does not produce a firm custard, but merely initiates the setting process. Accordingly, it is of advantage for the custard desserts to pass through an infrared energy zone on leaving the microwave field. On the one hand, this sets the custard firmly and, on the other hand, browns the upper layer of the custard (hardening). Passage through the infrared zone lasts 2 to 6 minutes, depending on the power of the electric plates used.

The invention also provides an arrangement for carrying out the process described above. The arrangement according to the invention comprises a conveyor belt, a microwave tunnel and a plate of a material impermeable to microwaves which is situated beneath the conveyor belt and over its entire width in the microwave zone. The material used has already been described in reference to the process. The plate used is between 1 and 5 mm thick. Since this plate also acts as a support for the conveyor belt, it should not be too thin. Nor should it be too thick because, otherwise, it would tend to be heated unnecessarily and to transfer this energy to the caramel layer and to the conveyor belt.

The microwave tunnel is between 6 and 9 meters in length and has a power output of 20 to 90 KW.

As mentioned above, when the caramel custard leaves the microwave tunnel, the setting process is continued by passage through an infrared zone. To this end, the arrangement further comprises a conveyor belt for passage through an infrared zone. This zone has a power output of 8 to 12 KW.

The arrangement according to the invention enables a caramel custard to be made in a shorter time by comparison with a conventional system. The arrangement according to the invention is fairly reduced in size and operates at an industrially acceptable rate. The raw material for the caramel custard is prepared with commercial liquid caramel and the liquid custard is prepared by mixing skimmed milk, skimmed milk powder, sugar, water and whole egg.

BRIEF DESCRIPTION OF THE DRAWING The invention is described with reference to the accompanying drawing which illustrates an apparatus arrangement for carrying out the process of the invention.

OPERATIONAL EXAMPLE AND DETAILED DESCRIPTION OF THE DRAWING

The conveyor belt (1) supports the containers (4) containing 5 g. of caramel and a 5 g. liquid custard mix and advances according to arrow A on rollers (2,3) and pass to the microwave tunnel (5) comprising 12 microwave generators (6). Each generator has as power of 6 KW. The custards enter at a temperature of 60° C. and leave after 2 min 40 sec at a temperature of 93° C. The tunnel has a length of 8 m. The metallic plate (7) giving protection to the caramel layer is in aluminium of a thickness of 2 mm. By disposing 12 rows of containers spaced from 20 mm maximum, we can reach a throughput of 10–12000 custards per hour. On leaving the microwave tunnel, the containers (4) pass from the connecting conveyor belt (13) onto a conveyor belt (8) advancing in the direction of the arrow B on return rollers (9, 10) into an infrared zone (11) comprising heating elements (12). The infrared energy amounts to 9.6 KW.

The custard desserts remain in the infrared zone for 2 minutes and leave at a temperature of the order of 98° C. However, the caramel remains at a temperature of 75° C. In this way, the custard is firmly set and the upper part of the dessert is browned.

I claim:

1. A process for preparing a custard dessert comprising passing a container containing a liquid custard mix through a microwave field and exposing the liquid mix in the container to microwave field energy, but so that microwave field energy at a position below a position of a base of the custard mix in the container is reflected away from the mix base, for a time to heat the mix to initiate setting the mix and so that upon leaving the field, a contained custard product having a temperature of from 90° C. to 95° C. is obtained.

2. A process according to claim 1 further comprising passing the contained custard product through a zone of infrared energy to firm and brown the custard product.

3. A process according to claim 1 or 2 wherein the mix to be passed through the microwave field has a temperature of from 10° C. to 600° C.

4. A process according to claim 1 or 2 wherein a plurality of containers containing the mix are passed through the microwave field and the mix is exposed to microwave field energy effected with a power output of from 20 KW to 90 KW.

5. A process according to claim 4 wherein the plurality of containers containing the mix pass through the microwave field for from 2 minutes to 9 minutes.

6. A process according to claim 2, wherein a plurality of containers containing the mix are passed through the microwave field and the plurality of containers containing the custard product are passed through the infrared energy zone and the infrared energy is effected with a power output of from 8 KW to 12 KW.

7. A process according to claim 6 wherein the plurality of containers containing the product pass through the infrared energy zone for from 2 minutes to 6 minutes.

8. A process according to claim 2 wherein a plurality of containers containing the mix are passed through the microwave field and the mix is exposed to microwave field energy effected with a power output of from 20 KW to 90 KW and the plurality of containers containing the custard product are passed through the infrared energy zone and the infrared energy is effected with a power output of from 8 KW to 12 KW.

9. A process according to claim 8 wherein the plurality of containers containing the mix pass through the microwave field for from 2 minutes to 9 minutes and the plurality of containers containing the product pass through the infrared zone for from 2 minutes to 6 minutes.

10. A process according to claim 1 or 2 wherein the base of the mix is contained in the container on a layer of caramel.

11. A process according to claim 1 or 2 wherein the container containing mix is passed through the microwave field on a top surface of a conveying belt and wherein microwave energy is reflected by a microwave-reflective material positioned beneath a bottom surface of the belt.

* * * * *

UNITED STATES PATENT AND TRADEMARK OFFICE
CERTIFICATE OF CORRECTION

PATENT NO. : 5,372,828
DATED : December 13, 1994
INVENTOR(S) : Toai LE VIET

It is certified that error appears in the above-indentified patent and that said Letters Patent is hereby corrected as shown below:

Column 1, line 32, delete "to".

Column 2, line 67, change the second occurence of "5" to --95--.

Column 3, line 6, delete "in".

Signed and Sealed this

Seventh Day of March, 1995

Attest:

BRUCE LEHMAN

*Attesting Officer*   *Commissioner of Patents and Trademarks*